United States Patent
Mohebbi et al.

(10) Patent No.: US 6,754,496 B2
(45) Date of Patent: Jun. 22, 2004

(54) REDUCING INTERFERENCE IN CELLULAR MOBILE COMMUNICATIONS NETWORKS

(75) Inventors: Behzad Mohebbi, San Diego, CA (US); Michael John Shearme, Amersham (GB)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/392,352

(22) Filed: Mar. 18, 2003

(65) Prior Publication Data

US 2003/0176190 A1 Sep. 18, 2003

Related U.S. Application Data

(60) Division of application No. 09/696,431, filed on Oct. 25, 2000, which is a continuation of application No. PCT/GB99/01344, filed on Apr. 28, 1999, and a continuation of application No. PCT/GB99/01347, filed on Apr. 28, 1999.

(30) Foreign Application Priority Data

May 14, 1998 (GB) .............................................. 9810424
May 14, 1998 (GB) .............................................. 9810425

(51) Int. Cl.[7] .............................................. H04Q 7/20
(52) U.S. Cl. .................... 455/436; 455/437; 455/439; 455/441; 455/442; 455/524; 455/525; 370/331; 370/332; 370/347
(58) Field of Search ................................ 455/436, 437, 455/439, 440, 441, 442, 426, 434, 447, 524, 525; 370/331, 332, 347

(56) References Cited

U.S. PATENT DOCUMENTS 5,276,905 A * 1/1994 Hurst et al. .............. 455/435.2
5,345,467 A * 9/1994 Lomp et al. ................. 370/331
5,517,674 A  5/1996 Rune
5,640,677 A * 6/1997 Karlsson ..................... 455/434

(List continued on next page.)

FOREIGN PATENT DOCUMENTS

EP       0797367 A2    9/1997
GB      2 337 414     11/1999

(List continued on next page.)

*Primary Examiner*—Marceau Milord
(74) *Attorney, Agent, or Firm*—Katten Muchin Zavis Rosenman

(57) ABSTRACT

In a cellular mobile communications network a mobile station is capable of receiving a downlink signal from each of a plurality of base stations and transmitting an uplink signal to the plurality of base stations through a wireless channel. A transmission property of the downlink signals from the plurality of base stations to the mobile station is measured, and decided, in dependence upon the measure of the transmission property, a preferred base station transmitting the downlink signal with a preferred transmission property among the plurality of the base stations. The mobile station includes, in the uplink signal, data indicating the preferred base station(s) for transmitting the subsequent downlink signal to the mobile station. The base stations receiving the uplink signal identify from the data the preferred based station(s) and only the base station(s) identified as the preferred base station(s) transmits a subsequent downlink signal to the mobile station. Interference in such a cellular mobile telecommunications network can therefore be reduced.

3 Claims, 9 Drawing Sheets

U.S. PATENT DOCUMENTS

| | | | | |
|---|---|---|---|---|
| 5,666,656 A | * | 9/1997 | Rautiola | 455/513 |
| 5,701,585 A | | 12/1997 | Kallin et al. | |
| 5,913,169 A | | 6/1999 | Vaara | |
| 5,920,817 A | * | 7/1999 | Umeda et al. | 455/437 |
| 5,995,834 A | * | 11/1999 | Moore | 455/434 |
| 6,108,322 A | | 8/2000 | Kotzin et al. | |
| 6,122,265 A | | 9/2000 | Nakamura et al. | |
| 6,141,555 A | | 10/2000 | Sato | |
| 6,501,951 B2 | * | 12/2002 | Moore | 455/434 |
| 6,510,146 B1 | * | 1/2003 | Korpela et al. | 370/332 |

FOREIGN PATENT DOCUMENTS

| | | |
|---|---|---|
| JP | 6-45978 | 2/1994 |
| JP | 6-188820 | 7/1994 |
| JP | 7-274232 | 10/1995 |
| JP | 7-298335 | 11/1995 |
| JP | 7-298336 | 11/1995 |
| JP | 8-505028 | 5/1996 |
| JP | 8-223629 | 8/1996 |
| JP | 9-247732 | 9/1997 |
| JP | 9-261725 | 10/1997 |
| JP | 10-28282 | 1/1998 |
| JP | 10-79985 | 3/1998 |
| JP | 10-510688 | 10/1998 |
| JP | 2991185 | 10/1999 |
| JP | 2002-199431 | 7/2002 |
| WO | 96/19088 | 6/1996 |
| WO | WO 97/08911 | 3/1997 |

* cited by examiner

REDUCING INTERFERENCE IN CELLULAR MOBILE COMMUNICATIONS NETWORKS

This application is a divisional of application Ser. No. 09/696,431, filed Oct. 25, 2000, now pending, which is a continuation of PCT application Serial No. PCT/GB99/01344 filed on Apr. 28, 1999 and PCT application Serial No. PCT/GB99/01347 filed on Apr. 28, 1999.

BACKGROUND OF THE INVENTION

1. Field of the Invention

The present invention relates to cellular mobile communication networks, for example Code Division Multiple Access (CDMA) cellular networks.

2. Description of the Prior Art

FIG. 1 of the accompanying drawings shows parts of a cellular mobile telecommunication network according to the Telecommunication Industries Association (TIA)/Electronic Industries Association (EIA) Standard TIA/EIA/IS-95 of October 1994 (hereinafter "IS95"). Each of three base transceiver stations (BTSs) 4 (BTS1, BTS2 and BTS3) is connected via a fixed network 5 to a base station controller (BSC) 6, which is in turn connected to a mobile switching center (MSC) 7. The BSC 6 serves to manage the radio resources of its connected BTSs 4, for example by performing hand-off and allocating radio channels. The MSC 7 serves to provide switching functions and coordinates location registration and call delivery.

Each BTS 4 serves a cell 8. When a mobile station (MS) 10 is in a so-called "soft hand-off" (SHO) region 9 where two or more cells overlap, a mobile station can receive transmission signals (downlink signals) of comparable strength and quality from the respective BTSs of the overlapping cells. Transmission signals (uplink signals) produced by the mobile station (MS) can also be received at comparable strengths and qualities by these different BTSs when the mobile station is in the SHO region 9.

FIG. 2 of the accompanying drawings shows a situation where the MS 10 is located within the SHO region 9, and is transmitting such uplink signals that are being received by plural BTSs 4. According to the IS95 standard, a BTS 4 that receives such an uplink signal from the MS 10 relays the signal to the BSC 6 via a dedicated connection line of the fixed network 5. At the BSC 6, one of the relayed signals is selected based on a comparison of the quality of each of the received signals, and the selected signal is relayed to the MSC 7. This selection is referred to as Selection Diversity.

Similarly, FIG. 3 of the accompanying drawings shows a situation where the MS 10 is located within the SHO region 9 and is receiving downlink signals from plural BTSs 4. According to the IS95 standard, downlink signals received by the BSC 6 from the MSC 7 are relayed to all BTSs 4 involved in the soft hand-off via respective connection lines of the fixed network 5, and subsequently transmitted by all the BTSs 4 to the MS 10. At the MS 10 the multiple signals may be combined, for example, by using maximum ratio combination (MRC), or one of them may be selected based on the signal strength or quality, i.e. using Selection Diversity as for the uplink case.

In contrast to, for example, Global System for Mobile Communication (GSM) networks, in CDMA networks each BTS 4 transmits at the same frequency. Consequently, careful control of transmission power must be maintained to minimize interference problems.

Signals are transmitted as a succession of frames according to the IS95 standard. As FIG. 4 of the accompanying drawings shows, each frame is of duration 20 ms, and comprises sixteen 1.25 ms time slots. In each time slot several bits of user data and/or control information can be transmitted.

Power control of transmissions from the MS 10 to the BTSs 4 (uplink power control) in IS95 is achieved as follows. When a BTS 4 receives a signal from the MS 10 it determines whether a predetermined property of the received signal (for example absolute signal level, signal to noise ratio (SNR), signal-to-interference ratio (SIR), bit error rate (BER) or frame error rate (FER)) exceeds a pre-selected threshold level. Based on this determination, the BTS 4 instructs the MS 10 either to reduce or to increase its transmission power in the next time slot.

For this purpose, two bits in every time slot of a pilot channel (PCH) from the BTS 4 to the MS 10 are allocated for uplink power control (see FIG. 4). Both bits have the same value, and accordingly will be referred to hereinafter as the "power control bit" (or PCB) in the singular. The power control bit is assigned a value of zero by the BTS 4 if the MS 10 is required to increase transmission power by 1 dB, and a value of one if the MS 10 is required to decrease transmission power by 1 dB. The BTS 4 is not able to request directly that the MS 10 maintain the same transmission power; only by alternately transmitting ones and zeros in the power control bit is the transmission power maintained at the same level.

When the MS 10 is in a SHO region 9, the MS 10 is required to make a decision on whether to increase or to decrease uplink transmission power based on a plurality of power control bits received respectively from the BTSs 4 involved in the soft hand-off. Consequently, an OR function is performed on all the power control bits. If the result of this OR function is zero then the MS 10 will increase power on uplink transmissions, and if the result is one then the MS 10 will decrease power on uplink transmissions. In this way, uplink transmission power is only increased if all BTSs 4 ask for an increase.

Power control of transmissions from the BTS 4 to the MS 10 (downlink power control) in IS95 is achieved as follows. When the MS 10 receives a downlink signal from a BTS 4 (or from each of a plurality of BTSs 4 in soft hand-off operation) via a traffic channel (TCH), the FER of that signal is calculated by the MS 10. The FER reflects the degree to which the traffic-channel signal has been corrupted by, for example, noise. This FER is then relayed by the MS 10 to the BTS 4 which transmitted the downlink signal concerned, and the BTS 4 uses this FER to decide whether to make any change to its downlink transmission power.

The soft hand-off system described above is effective in improving signal transmission between the MS 10 and the network when the MS 10 is located in regions of cell overlap near the boundaries of the individual cells. Signal quality in these regions when using a single BTS 4 may be relatively poor, but by making use of more than one BTS 4 the quality may be substantially improved.

However, the IS95 soft hand-off system has the disadvantage of increasing signal traffic in the cellular network since it is necessary to transmit downlink signals carrying the same data and/or control information to the MS 10 from every BTS 4 involved in the soft hand-off. This duplication of transmissions is undesirable because each transmission is potentially a source of interference to other transmissions in the network.

For example, the downlink-power control method aims at ensuring that the MS 10 receives a useful downlink signal from every one of the BTSs 4 involved in the soft hand-off. In the event that the downlink signal from one of the BTSs is undergoing a deep fade, the MS 10 will instruct the BTS concerned to increase its downlink transmission power significantly. However, in this case the BTS concerned will inevitably cause greater interference to other transmissions taking place in its cell and in neighboring cells. This problem may be exacerbated if, as in the IS95 standard, only one PCB is allocated in common for downlink power control to all of the BTSs involved in the soft hand-off. In this case, not only does the BTS that is experiencing a deep fade increase its downlink transmission power significantly, but also every other one of the BTSs involved in the soft hand-off increases its downlink transmission power, significantly increasing the interference within the cellular network as a whole.

Therefore, it is desirable to reduce interference in the cellular network associated with the soft hand-off operation. It is also desirable to reduce interference in cellular networks in other situations in which a mobile station is in communications range of more than one base transceiver station.

SUMMARY OF THE INVENTION

According to a first aspect of the present invention there is provided a cellular mobile communications network including: a candidate base transceiver station identifying unit operable, when a mobile station of the network is capable of receiving a downlink signal from a plurality of base transceiver stations of the network, to identify at least two different candidate base transceiver station selections. Each such selection specifying one or more base transceiver stations of the plurality for possible use in transmitting a subsequent such downlink signal to the mobile station. A network interference determining unit operable, for each of the candidate selections, to produce a measure of the network interference that would be caused by the base transceiver station(s) specified in that candidate selection transmitting the subsequent downlink signal to the mobile station. A decision unit operable, in dependence upon the network-interference measures, to decide which one of the candidate selections is to be used to transmit the subsequent downlink signal to the mobile station, so as to tend to reduce network interference arising from the transmission of that downlink signal.

According to a second aspect of the present invention there is provided a mobile station, for use in a cellular mobile communications network, including: a candidate base transceiver station identifying unit operable, when the mobile station is capable of receiving a downlink signal from a plurality of base transceiver stations of the network, to identify at least two different candidate base transceiver station selections. Each such candidate selection specifying one or more base transceiver stations of the plurality for possible use in transmitting a subsequent such downlink signal to the mobile station. A network interference determining unit operable for each of the candidate selections, to produce a measure of the network interference that would be caused by the base transceiver station(s) specified in that selection transmitting the subsequent downlink signal to the mobile station. A decision unit operable, in dependence upon the network-interference measures, to decide which one of the candidate selections should be used to transmit the subsequent downlink signal to the mobile station, so as to tend to reduce network interference arising from the transmission of that downlink signal.

According to a third aspect of the present invention there is provided a base transceiver station, for use in a cellular mobile communications network, including: A candidate base transceiver station identifying unit operable, when a mobile station of the network is capable of receiving a downlink signal from a plurality of base transceiver stations of the network including the base transceiver station, to identify at least two different candidate base transceiver station selections. Each such candidate selection specifying one or more base transceiver stations of the plurality for possible use in transmitting a subsequent such downlink signal to the mobile station. A network interference determining unit operable, for each of the candidate selections, to produce a measure of the network interference that would be caused by the base transceiver station(s) specified in that selection transmitting the subsequent downlink signal to the mobile station. A decision unit operable, in dependence upon the network-interference measures, to decide which one of the candidate selections should be used to transmit the subsequent downlink signal to the mobile station, so as to tend to reduce network interference arising from the transmission of that downlink signal.

According to a fourth aspect of the present invention there is provided a base station controller, for use in a cellular mobile communications network, including: A candidate base transceiver station identifying unit operable, when a mobile station of the network is capable of receiving a downlink signal from a plurality of base transceiver stations of the network, to identify at least two different candidate base transceiver station selections. Each such candidate selection specifying one or more base transceiver stations of the plurality for possible use in transmitting a subsequent such downlink signal to the mobile station. A network interference determining unit operable, for each of the candidate selections, to produce a measure of the network interference that would be caused by the base transceiver station(s) specified in that selection transmitting the subsequent downlink signal to the mobile station. A decision unit operable, in dependence upon the network-interference measures, to decide which one of the candidate selections to use to transmit the subsequent downlink signal to the mobile station, so as to tend to reduce network interference arising from the transmission of that downlink signal.

According to a fifth aspect of the present invention there is provided a communications method for use in a cellular mobile communications network, including: when a mobile station of the network is capable of receiving a downlink signal from a plurality of base transceiver stations of the network, identifying at least two different candidate base transceiver station selections, each such selection specifying one or more base transceiver stations of the plurality for possible use in transmitting a subsequent such downlink signal to the mobile station; producing, for each of the candidate selections, a measure of the network interference that would be caused by the base transceiver station(s) specified in that selection transmitting the subsequent downlink signal to the mobile station; and deciding, in dependence upon the network-interference measures, which one of the said candidate selections to use to transmit that subsequent downlink signal to the mobile station, so as to tend to reduce network interference arising from the transmission of that downlink signal.

In one embodiment of the first to fifth aspects of the invention, the candidate selections may include, for each BTS of the plurality, a selection in which just that BTS is specified, as well as a further selection in which all the BTSs of the plurality are specified. It is not essential for the candidate selections to include selections specifying only one BTS. For example, if there are three BTSs involved in a soft hand-off operation, the selections could be BTS1+ BTS2, BTS2+BTS3, BTS3+BTS1, and BTS1+BTS2+ BTS3. It is also not essential for the candidate selections to include a selection specifying all the BTSs involved in the soft hand-off. Furthermore, the transmission powers for the BTSs specified in a particular selection can be set to any suitable combination of values capable of facilitating adequate reception of the downlink signal at the subject mobile station. Thus, for example, two or more candidate selections could specify the same BTSs but specify different respective sets of transmission powers for the selections. In other words, two candidate selections could differ from one another only in respect of the transmission powers of the (same) specified BTSs.

According to a sixth aspect of the present invention there is provided a mobile station for use a cellular mobile communications network, including: A base transceiver station decision unit operable, when the mobile station is capable of receiving a downlink signal from a plurality of base transceiver stations of the network, to determine that at least one of the base transceiver stations of the plurality is not to transmit a subsequent such downlink signal to the mobile station; and a base transceiver station informing unit operable to inform the base transceiver stations of the plurality of the determination made by the base transceiver station decision unit using one or more uplink signals transmitted by the mobile station to such base transceiver stations.

According to a seventh aspect of the present invention there is provided a base transceiver station for use in a cellular mobile communications network, including: A receiver for receiving uplink signals from a mobile station of the network, one or more of which uplink signals includes, when the mobile station is capable of receiving a downlink signal from a plurality of base transceiver stations of the network including the base transceiver station, base transceiver station selection information specifying that at least one of the base transceiver stations of the plurality is not to transmit a subsequent such downlink signal to the mobile station; and a disabling unit operable to process such base transceiver station selection information and to prevent the base transceiver station from transmitting such a subsequent downlink signal if the received base transceiver station selection information specifies that the base transceiver station is not to transmit the subsequent downlink signal.

The sixth and seventh aspects of the present invention are not limited to downlink transmission selection for the purpose of interference reduction. Embodiments of these aspects of the invention can be used in any situation in which it is desired to prevent at least one BTS in communications range of a mobile station from transmitting a downlink signal to that mobile station.

According to an eighth aspect of the present invention there is provided a mobile station, for use in a cellular mobile communications network, including: a transmitter for transmitting uplink signals to a base transceiver station of the network and a signal information processor connected to the transmitter and operable, during a soft hand-off operation involving a plurality of such base transceiver stations of the network, to produce respective signal measures for all the base transceiver stations involved in the operation, each such signal measure serving to indicate the performance of a communications channel between the mobile station and the base transceiver station concerned, and also operable to employ the produced signal measures to determine which of the involved base transceiver stations should be used to transmit a subsequent downlink signal to the mobile station, and to cause the transmitter to include, in such an uplink signal transmitted thereby, a base transceiver station selection message identifying the determined base transceiver station(s).

According to a ninth aspect of the present invention there is provided a base station controller, for use in a cellular mobile communications network to apply downlink signals to a plurality of base transceiver stations of the network, including: a receiver for receiving uplink signals from one or more of the base transceiver stations, at least one of which uplink signals includes, when a mobile station is engaged in a soft hand-off operation involving more than one of the base transceiver stations of the network, a base transceiver station selection message identifying which of the involved base transceiver stations should be used to transmit a subsequent one of the downlink signals to the mobile station; and a soft hand-off control unit operable to receive the uplink signal including the base transceiver station selection message and to transmit the subsequent downlink signal only to the determined base transceiver station(s) identified in the message.

According to a tenth aspect of the present invention there is provided a soft hand-off control method for use in a cellular mobile communications network, wherein: when a soft hand-off operation involving more than one base transceiver station of the network is being performed, a mobile station produces respective signal measures for all the base transceiver stations involved in the operation, each such signal measure serving to indicate the performance of a communications channel between the mobile station and the base transceiver station concerned; and the produced signal measures are employed to determine which of the involved base transceiver stations should be used to transmit a subsequent downlink signal to the mobile station.

The signal measures can be any suitable measure of the communications-channel performance between the mobile station and the base transceiver stations, for example signal strength measures (received signal strength in terms of power or amplitude or quality measures (frame error rate, signal-to-interference ratio, etc) or a combination of both strength and quality.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 5:
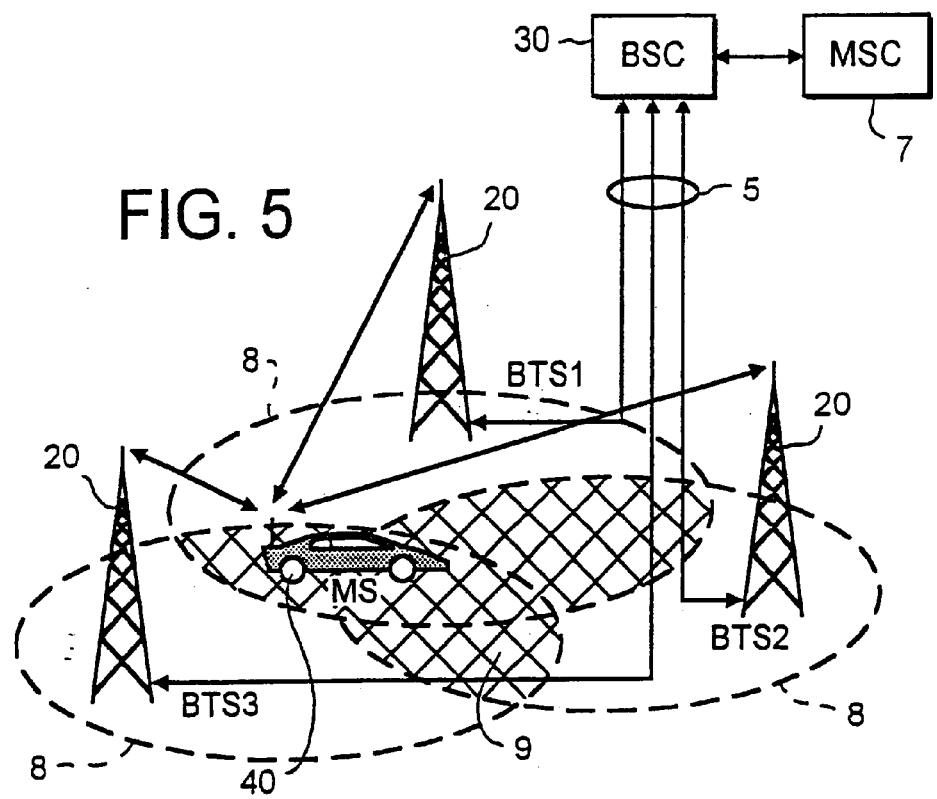
FIG. 5 shows parts of a mobile telecommunication network embodying the present invention.

FIG. 5 shows parts of a mobile telecommunication network embodying the present invention. In FIG. 5, elements that are the same as elements of the FIG. 1 network described previously have the same reference numerals and an explanation thereof is omitted.

The FIG. 5 network is a wideband CDMA (W-CDMA) network for a proposed new standard for mobile telecommunications, referred to as a universal mobile telecommunications system (UMTS) or UMTS terrestrial radio access (UTRA). This is generally similar to the IS95-standard network described previously, although certain implementation details are yet to be finalized. Details that are different from IS95 include the frame duration, which is 10 ms, and the time-slot duration which is 625 $\mu$s. The overall bit rate is within the range from 8 kbits/s to 2 Mbits/s. Also downlink power control in W-CDMA is closed-loop and is based on the same principles as the uplink power control.

In FIG. 5, each of three base transceiver stations (BTSs) 20 (BTS1, BTS2 and BTS3) is connected via a fixed network 5 to a base station controller (BSC) 30, which is in turn connected to a mobile switching center (MSC) 7. Each BTS 20 serves a cell 8. A mobile station (MS) 40 is in a soft hand-off (SHO) region 9 and can receive downlink signals from, and transmit uplink signals to, all the BTSs 20 involved in the soft hand-off.

Figure 1:
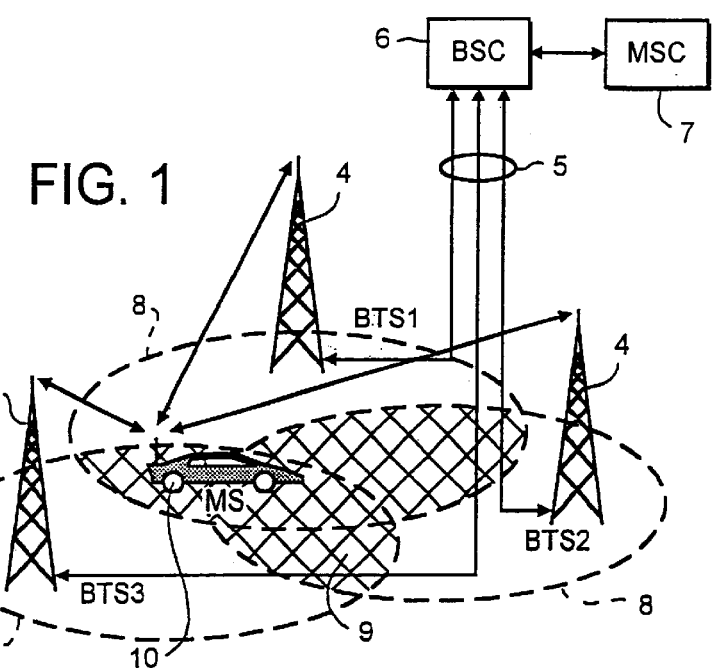
FIG. 1, discussed hereinbefore, shows parts of a cellular mobile telecommunication network according to IS95.
Figure 2:
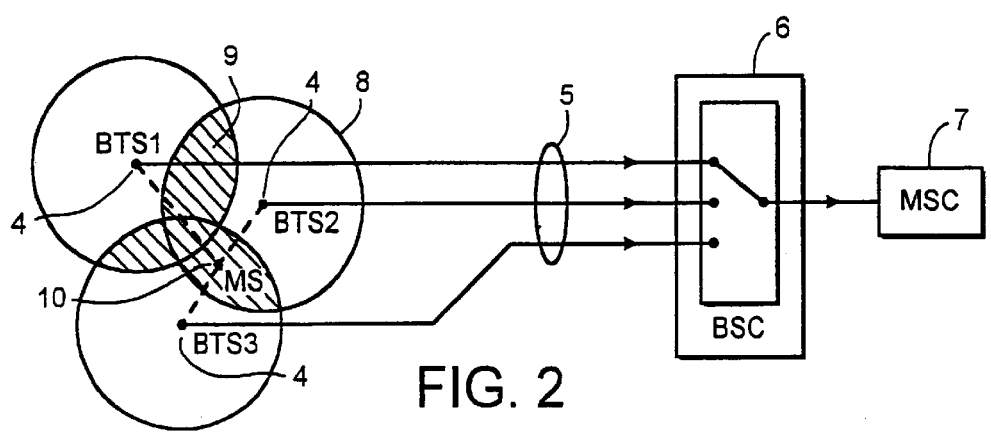
FIG. 2, also discussed hereinbefore, shows a schematic view for use in explaining processing of uplink signals in a soft hand-off operation performed by the FIG. 1 network.
Figure 3:
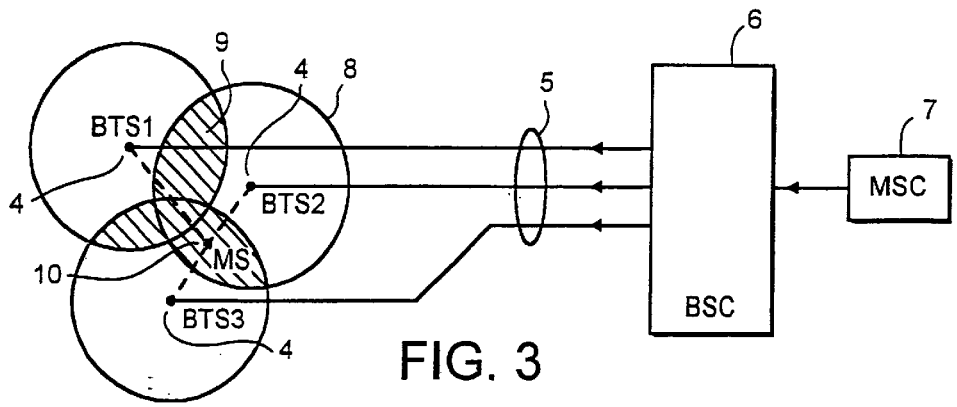
FIG. 3, also discussed hereinbefore, shows a schematic view for use in explaining processing of downlink signals in such a soft hand-off operation.
Figure 4:
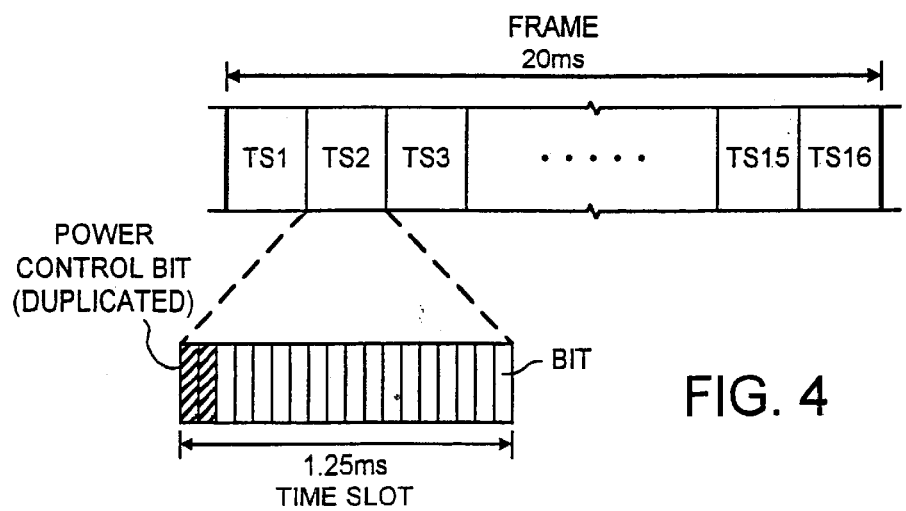
FIG. 4, also discussed hereinbefore, illustrates the format of a time frame in the FIG. 1 network.

The FIG. 5 network corresponds generally with the FIG. 1 network, but the MS 40, BTSs 20 and BSC 30 are constructed and operate differently from the corresponding elements in FIG. 1.

Figure 6:
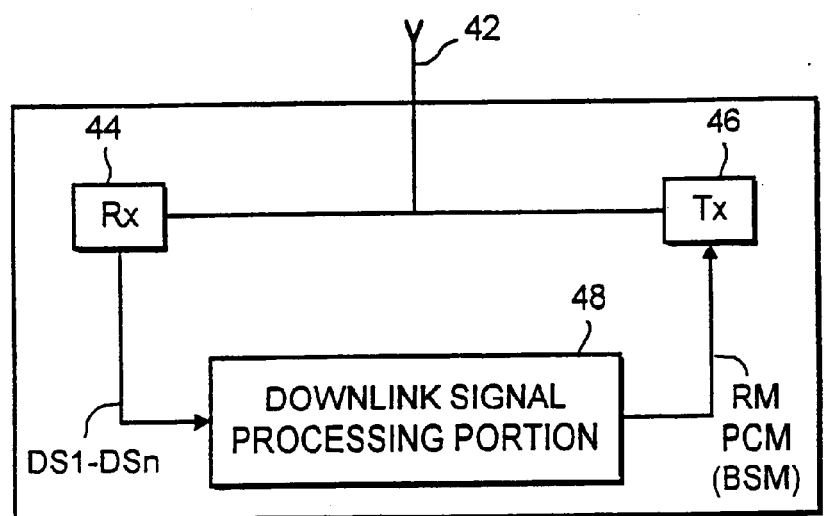
FIG. 6 shows parts of a mobile station embodying to the present invention.

FIG. 6 is a block diagram showing parts of a MS 40 embodying the present invention. An antenna element 42 is connected (e.g. via a duplexer—not shown) to a receiver portion 44 and a transmitter portion 46. A downlink signal processing portion 48 receives from the receiver portion 44 respective downlink signals DS1 to DSn produced by n BTSs BTS1 to BTSn (n is an integer) involved in the soft hand-off operation. The downlink signal processing portion 48 applies a BTS selection message BSM to the transmitter portion 46.

Figure 7:
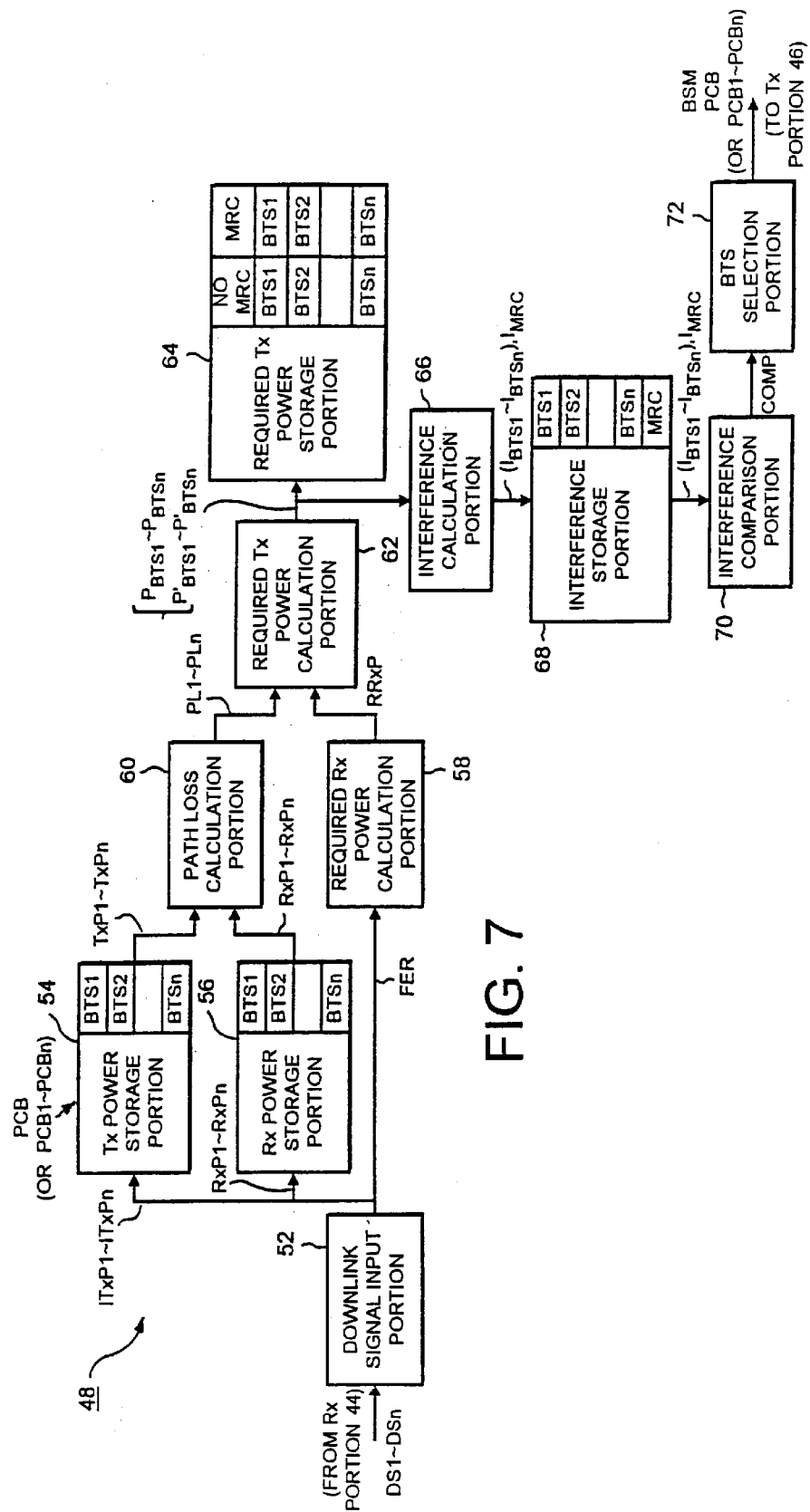
FIG. 7 is a detailed block diagram showing parts of the FIG. 6 mobile station.

FIG. 7 shows a block diagram of the downlink signal processing portion 48. The downlink signal processing portion 48 includes a downlink signal input portion 52 which receives the downlink signals DS1 to DSn from the receiver portion 44. The downlink signal processing portion 48 further includes respective TX and RX power storage portions 54 and 56, each connected to the downlink signal input portion 52. The TX power storage portion 54 receives a single power control bit PCB, or respective power control bits PCB1 to PCBn corresponding respectively to the BTSs involved in the soft hand-off operation, and also receives from the downlink signal input portion 52 initial transmission powers TXP1 to TXPn corresponding respectively to those BTSs.

The downlink signal input portion 52 also applies to the RX power storage portion 56 received power measures RXP1 to RXPn corresponding respectively to the BTSs, each representing the power at which a downlink signal from the corresponding BTS is received by the mobile station.

Each of the power storage portions 54 and 56 includes storage regions corresponding respectively to the different BTSs.

The downlink signal processing portion 48 also includes a required RX power calculation portion 58 which receives a further signal measure FER, representing a downlink frame error rate determined by the mobile station, from the downlink signal input portion 52.

The downlink signal processing portion 48 further includes a path loss calculation portion 60 which receives from the TX power storage portion 54 respective transmit powers TXP1 to TXPn for the different BTSs and also receives respective receive powers RXP1 to RXPn for the different BTSs from the RX power storage portion 56.

The downlink signal processing portion 48 further includes a required TX power calculation portion 62 which receives respective path loss measures PL1 to PLn for the different BTSs from the path loss calculation portion 60 and a required RX power RRXP from the required RX power calculation portion 58.

The downlink signal processing portion 48 further includes a required TX power storage portion 64 and an interference calculation portion 66, both of which receive from the required TX power calculation portion 62 first and second sets of required transmission powers. The first set of required transmission powers $P_{BTS1}$ to $P_{BTSn}$ represent required transmission powers of the different BTSs when the mobile station 40 is not using maximum ratio combining (MRC). The second set of transmission power measures $P'_{BTS1}$ to $P'_{BTSn}$ represent the required transmission powers of the different BTSs when MRC is employed at the MS 40. The required TX power storage portion 64 has first and second sets of storage regions corresponding to the two sets of transmission power measures.

The downlink signal processing portion 48 further includes an interference storage portion 68 which receives interference measures $I_{BTS1}$ to $I_{BTSn}$ corresponding respectively to the different BTSs (transmitting alone), as well as a further interference measure $I_{MRC}$ representing interference when all BTSs are used to transmit downlink signals and MRC is performed at the MS 40. The interference storage portion 68 has storage regions corresponding respectively to these different interference measures.

The downlink signal processing portion 48 further includes an interference comparison portion 70 which receives the interference measures $I_{BTS1}$ to $I_{BTSn}$ and $I_{MRC}$ from the interference storage portion 68 and produces a comparison signal COMP which is applied to a BTS selection portion 72. The BTS selection portion 72 produces a BTS selection message (BSM) and a power control bit PCB (or plural PCBs PCB1 to PCBn), which are applied to the transmitter portion 46 of the mobile station 40.

Operation of the mobile station 40 of FIG. 7 will now be explained with reference to the flowchart of FIG. 8. In this example, it will be assumed, for the sake of simplicity, that there are only two BTSs involved in the soft hand-off operation.

In a first step S1 the downlink signal input portion 52 detects, in a downlink signal received from a first one (hereinafter BTS1) of the BTSs involved in the soft hand-off operation, for example a signal on a dedicated control channel DCCH thereof, the initial transmit power ITXP1 of BTS1.

As explained previously, the downlink power control method proposed for use in W-CDMA adjusts the transmission power of the BTSs in communication with a particular MS in dependence upon power control bits PCBs generated by the mobile station. At present, the proposed standard for W-CDMA specifies that a single PCB be used to control the downlink transmit powers of all of the BTSs involved in the soft hand-off operation. Thus, in this case all the involved BTSs increase or reduce their transmission powers together in accordance with the single PCB. However, it is also possible, in an embodiment of the present invention, to allocate each BTS involved in the soft hand-off operation its own individual PCB, enabling the MS to control the downlink transmission powers of the different involved BTSs independently of one another. In this case (as shown in parenthesis in FIG. 7) the TX power storage portion 54 receives PCBs PCB1 to PCBn corresponding respectively to the different BTSs involved in the soft hand-off operation.

In step S1 the initial transmission power ITXP1 for BTS1 is stored in the storage region allocated to BTS1 in the TX power storage portion 54. Thereafter, each time a new PCB (PCB or PCB1, as the case may be) applicable to BTS1 is generated by the MS (for example every time slot) the TX power storage portion 54 updates the transmission power TXP1 stored in the storage region for BTS1 so that, at any given time, the value stored represents the instantaneous downlink transmission power of BTS1.

In step S2 the initial transmission power ITXP2 for the second BTS (hereinafter BTS2) involved in the soft hand-off operation is detected by the downlink signal input portion 52 in one of the downlink signals received from BTS2 and is stored in the storage region of the TX power storage portion 54 allocated to BTS2. The stored transmission power TXP2, for BTS2 is also updated each time a PCB (PCB or PCB2) applicable to BTS2 is generated by the mobile station.

Next, in step S3, the downlink signal input portion 52 processes the downlink signal DS1 received from BTS1 (either on a traffic channel TCH thereof or on a control channel dedicated control channel (DCCH) thereof) and derives therefrom a measure RXP1 of the received power of the downlink signal DS1 concerned. This measure (for example the received signal strength RSS) is stored in the storage region allocated to BTS1 in the RX power storage portion 56.

In step S4 the same operation is performed for BTS2 and the result stored in the storage region allocated to BTS2 in the RX power storage portion 56. Incidentally, in steps S3 and S4, the received power RXP may be calculated from the DCCH downlink signal in the event (as explained later) that the traffic channel TCH from the BTS concerned is switched off.

In step S5 the path loss calculation portion 60 receives from the storage location for BTS1 in the TX power storage portion 54 the stored (and updated) transmission power TXP1 for BTS1, and also receives from the storage region for BTS1 in the RX power storage portion 56 the received power RXP1 for BTS1. The path loss calculation portion 60 subtracts the received power RXP1 from the transmit power TXP1 to determine the path loss PL1 for BTS1. In step S6 the same operations are repeated for BTS2.

In step S7 the required RX power calculation portion 58 determines, based on a predetermined characteristic (e.g. the frame error rate FER) of the received downlink signals as a whole (e.g. after maximum ratio combining MRC), a required RX power RRXP which represents the minimum power that the mobile station presently needs to receive in order to produce an overall downlink signal DS of acceptable quality.

In step S8 the required TX power calculation portion 62 receives the path loss PL1 for BTS1 and the required RX power RRXP. Based on these inputs, it calculates a downlink transmission power $P_{BTS1}$ required from BTS1 assuming that BTS1 is the only BTS permitted to send the downlink signal in the next time slot to the mobile station. This required transmission power $P_{BTS1}$ may be calculated, for example, by adding together PL1 and RRXP. The calculated required downlink transmission power $P_{BTS1}$ is then stored in the TX power storage portion 64 in the storage region allocated to BTS1 in the first set of storage regions thereof (the set relating to the case in which maximum ratio combining (MRC) is not performed in the mobile station).

Then, in step S9, the interference calculation portion 66 receives the required downlink transmission power $P_{BTS1}$ calculated in step S8 and calculates therefrom a measure $I_{BTS1}$ of the amount of network interference that would be caused by BTS1 (alone) operating at the downlink transmission power $P_{BTS1}$. This measure is stored in an appropriate one of the storage region allocated to BTS1 in the interference storage portion 68.

Next, in steps S10 and steps S11 the processings of steps S8 and S9 are repeated for BTS2. The resulting required downlink transmission power $P_{BTS2}$ and the network-interference measure $I_{BTS2}$ are stored respectively in storage regions allocated to BTS2 in the portions 64 and 68.

In step S12 the required TX power calculation portion 62 calculates, for each of the BTSs BTS1 and BTS2, the required downlink transmission power $P'_{BTS1}$ or $P'_{BTS2}$ assuming that MRC is to be used at the mobile station. These results are stored in storage regions allocated to BTS1 and BTS2 in the second set of storage regions of the required TX power storage portion 64.

In step S13 the interference calculation portion 66 employs the required downlink transmission powers $P'_{BTS1}$ and $P'_{BTS2}$ calculated in step, S12 to determine a measure of the network interference that would result assuming that BTS1 is transmitting at $P'_{BTS1}$ and BTS2 is transmitting at $P'_{BTS2}$. The resulting interference measure $I_{MRC}$ is stored in a further one of the storage regions of the interference storage portion 68.

Next, in step S14 the interference comparison portion 70 compares the interference measures $I_{BTS1}$ and $I_{BTS2}$ retrieved from the interference storage portion 68. If $I_{BTS1}$ is less than $I_{BTS2}$ processing proceeds to step S15 in which $I_{BTS1}$ is compared with $I_{MRC}$. If $I_{BTS1} < I_{MRC}$ in step S15, in step S16 the BTS selection portion 72 determines that the downlink signal in the next time slot should be sent to the mobile station by BTS1 alone, on the basis that this will result in the lowest network interference. The BTS selection portion 72 generates a BTS selection message (BSM) specifying that BTS2 is not to transmit the downlink signal in the next time slot. The BSM is delivered to the transmitter portion 46 of the mobile station for transmission to BTS2. At the same time, the BTS selection portion 72 determines the power control bit PCB to be transmitted to BTS1 to control the downlink transmission power of BTS1 in the next time slot so that it has the value $P_{BTS1}$ calculated in step S8. As noted previously, this PCB may be a single PCB common to all BTSs involved in the soft hand-off operation, or a unique PCB (PCB1) for BTS1.

If, in step S14, $I_{BTS2}$ was found to be less than or equal to $I_{BTS1}$, or if in step S15 $I_{MRC}$ was found to be less than or equal to $I_{BTS1}$, processing proceeds to step S17. In step S17, the interference comparison portion 70 compares $I_{BTS2}$ with $I_{MRC}$. If $I_{BTS2}$ is less than $I_{MRC}$ processing proceeds to step S18 in which the BTS selection portion 72 determines that the downlink signal for the mobile station in the next time slot should be transmitted by BTS2 alone, on the basis that BTS2 operating alone will produce the lowest network interference. In this case, the BTS selection portion 72 generates a BSM which instructs BTS1 not to transmit in the next time slot. Also, the PCB applicable to BTS2 is set by the BTS selection portion 72 to control the downlink transmission power of BTS2 to meet the required TX power $P_{BTS2}$ calculated in step S10.

If in step S17 the result of the comparison is that $I_{MRC}$ is less than or equal to $I_{BTS2}$, processing proceeds to step S19 in which the BTS selection portion 72 determines that both BTS1 and BTS2 should be used to transmit the downlink signal in the next time slot, on the basis that this will result in the lowest network interference. In this case, the BTS selection portion 72 generates a BSM specifying that both BTSs are to transmit in the next time slot, and sets the PCB (or PCBs) to cause the BTSs to transmit the downlink signal in the next time slot at the required transmission powers $P'_{BTS1}$ and $P'_{BTS2}$ calculated in step S12.

Thus, in the example described above it can be seen that three different candidate BTS selections are identified: a first candidate selection in which BTS1 alone is specified for transmitting the downlink signal; a second candidate selection in which BTS2 alone is specified for transmitting the downlink signal; and a third candidate selection in which both BTS1 and BTS2 are specified for transmitting the downlink signal. For each candidate selection, the required transmission power $P_{BTS}$ (or $P'_{BTS}$) of each BTS specified in the selection is calculated and a measure of the network interference that would result from the specified BTS(s) transmitting is also calculated. These network-interference measures are then employed (e.g. the lowest measure is found by comparison of the measures) to decide which of the candidate selections to use for transmission of the downlink signal, so as to tend to reduce the network interference associated with that transmission.

It is not essential for the candidate selections to include selections specifying only one BTS. For example, if there are three BTSs involved in a soft hand-off operation, the selections could be BTS1+BTS2, BTS2+BTS3, BTS3+ BTS1, and BTS1+BTS2+BTS3. It is also not essential for the candidate selections to include a selection specifying all the BTSs involved in the soft hand-off. Furthermore, the transmission powers for the BTSs specified in a particular selection can be set to any suitable combination of values capable of facilitating adequate reception of the downlink signal at the subject mobile station. Thus, for example, two or more candidate selections could specify the same BTSs but specify different respective sets of transmission powers for the selections.

One example of the possible format of the BTS selection message BSM will now be explained with reference to FIG. 9.

The BTSs involved in a soft hand-off operation are ranked in some way. For example, the ranking may be carried out in the mobile station based on a predetermined property of the respective downlink signals DS1 to DSn that are received by the MS 40, for example the received signal strength (RSS). Alternatively, the ranking may be on a "first-come first-served" basis, i.e. on the order in which the BTSs became involved in the soft hand-off operation. Alternatively, the ranking could be random. Once the ranking has been determined, the mobile station sends a ranking message RM, indicating the order in which the BTSs are presently ranked, via a control channel to all BTSs.

Figure 8:
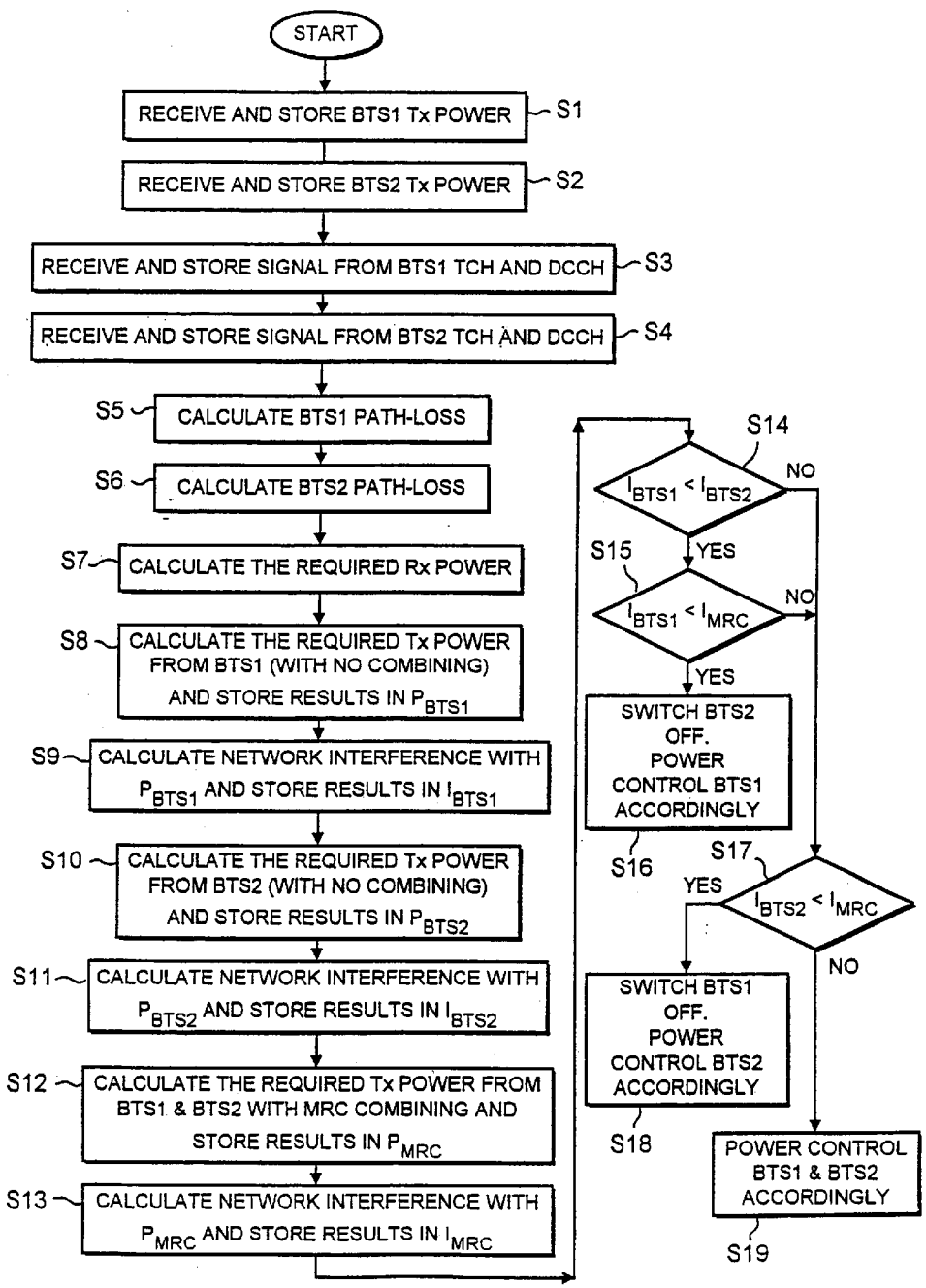
FIG. 8 is a flowchart for use in explaining operation of the FIG. 6 mobile station.
Figure 9:
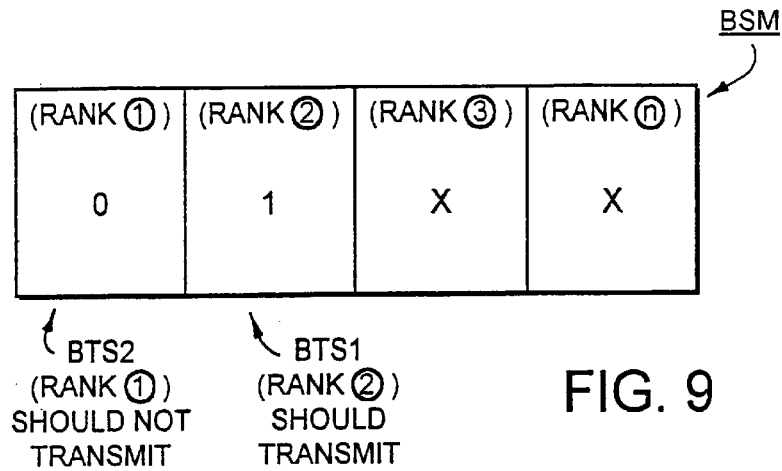
FIG. 9 is a schematic view for illustrating a possible format of a message transmitted by the FIG. 6 mobile station.

As shown in FIG. 9, the BSM has one bit corresponding to each rank of BTS, and these bits are arranged in the BSM in the ranking order determined by the MS. Take, for example, the case described previously with reference to FIG. 8 in which there are only two BTSs involved in the soft hand-off operation, namely BTS1 and BTS2. Assume also that, in the order of ranking determined by the mobile station, BTS2 is the highest-ranked BTS (rank ①), and that the other BTS, BTS1, has rank ②. Assume also that the outcome of the comparisons of the interference measures is the outcome shown in S16, namely that BTS2 should not transmit the downlink signal in the next time slot. To communicate this result to the BTSs involved in the soft hand-off operation, the first bit (corresponding to rank ①) in the BSM is set to 0, to indicate that BTS2 should not transmit the downlink signal in the next time slot. The second bit of the BSM (which corresponds to the rank-② BTS) is set to 1, to indicate that the rank-② BTS, BTS1, should transmit the downlink signal in the next time slot. Any remaining bits of the BSM can be set to a "don't-care" state, since in this example only two BTSs are involved in the soft hand-off operation. Incidentally, the BSM in this case could consist of two bits only, of course.

The ranking of a BTS may periodically require updating, for several reasons. Firstly, as the MS 40 moves, a downlink signal may be received from a new BTS or an existing BTS may no longer may able to provide a detectable downlink signal. Secondly, the qualities of the signals received from the BTSs 20 may have changed, e.g. due to fading. Thus, from time to time a ranking update is required. Such an update may be carried out periodically at regular time intervals (for example every several hundred milliseconds as in GSM networks), or every frame or even every time slot. Alternatively, the ranking could be updated only when a new BTS is detected or contact with an existing one lost.

Figure 10:
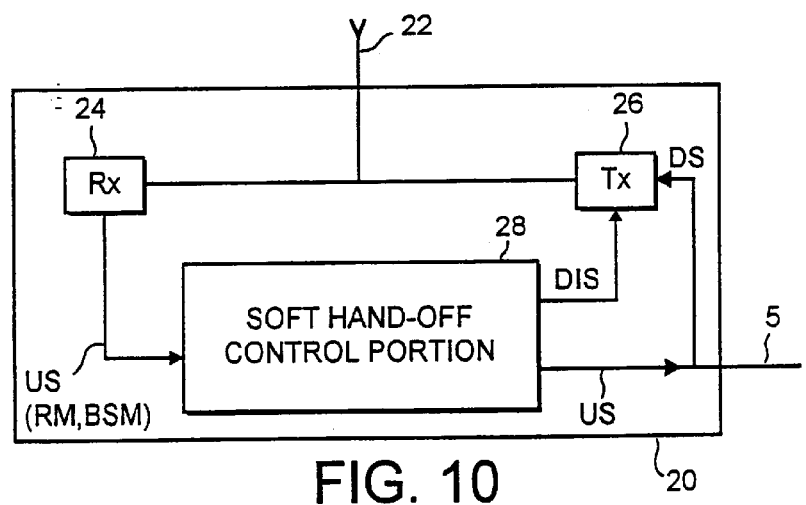
FIG. 10 shows parts of a base transceiver station embodying the present invention.

FIG. 10 is a block diagram showing parts of a BTS 20 embodying the present invention. This BTS 20 is specially adapted to receive and process the ranking message RM and the BTS selection message BSM sent by the MS 40 of FIG. 6.

An antenna element 22 is connected (e.g. via a duplexer—not shown) to a receiver portion 24 and a transmitter portion 26. A soft hand-off control portion 28 receives an uplink signal US from the receiver portion 24, and in turn applies the received US (or a signal derived therefrom) to the fixed network 5 for transmission to the BSC 30. The transmitter portion 26 receives a downlink signal DS via the connection line 5 from the BSC 30 (FIG. 5) and a disabling signal DIS from the soft hand-off control portion 28.

In use of the BTS 20, the uplink signals sent by the MS 40 when it is in the soft hand-off region 9 include, from time to time, a ranking message RM. The uplink signals US detected by the receiver portion 24 in the BTS 20 are applied to the soft hand-off control portion 28. When the soft hand-off control portion 28 detects that a ranking message RM is included in one of the uplink signals US received thereby, it processes the ranking message concerned to determine the rank of its BTS within the ranking order determined by the MS.

In each time slot, the uplink signals US produced by the receiver portion 24 also include a BTS selection message BSM determined by the MS 40 as described above.

Operation of the soft hand-off control portion 28 in response to the presence of such a BSM in the uplink signal US produced by the receiver portion 24 will now be described.

It is assumed that, by the time the BSM is received, a ranking message RM has already been received and processed (as indicated above) by the soft hand-off control portion 28.

The BSM is supplied by the receiver portion 24 to the soft hand-off control portion 28 where is examined. The soft hand-off control portion 28 checks the rank of its BTS based on the last-received ranking message and then examines the bit corresponding to that rank in the BSM. If the bit is 0 the soft hand-off control portion 28 applies a disabling signal DIS to the transmitter portion 26 to prevent it from transmitting the downlink signal in the next time slot.

The measure of network interference $I_{BTS1}$, $I_{BTS2}$ or $I_{MRC}$ can be calculated as follows by considering the interference that would be experienced by an imaginary mobile station, other than the subject mobile station, operating in the soft hand-off region (FIG. 5), as a consequence of the BTS(S) concerned transmitting at the determined required transmission power(s). In the case of $I_{BTS1}$, for example, the interference is calculated based on the required transmission power $P_{BTS1}$ from $BTS_1$ to the subject mobile station and the associated mean path loss experienced by the imaginary mobile station (which is the same as for the subject mobile station). This mean path loss is a time-averaged path loss for which the averaging period is chosen so as to average out (or ideally eliminate) the effects of Rayleigh fading. In other words, the path loss variation due to Rayleigh fading is averaged out.

In the case of $I_{MRC}$ the interference is calculated based on the cumulative sum of the respective carrier power levels of BTS1 and BTS2 at the antenna of the imaginary mobile station. Again, these carrier power levels are calculated based on the required transmission powers $P'_{BTS1}$ and $P'_{BTS2}$ for BTS1 and BTS2 when MRC is used and the respective mean path losses which have already been established at the subject mobile station (and are assumed to be the same for the imaginary mobile station).

Take, for example, a situation in which the downlink signal from BTS2 is undergoing a deep fade. This means that PL2 will be large relative to PL1. In this case, the required transmission power PBTS2 for BTS2 will be large as compared to the required transmission power BTS1 for BTS1. Thus, $I_{BTS2}$ will be large relative to $I_{BTS1}$. Also, in view of the large PL2, $P'_{BTS2}$ will also be large so that $I_{MRC}$ will be larger than $I_{BTS1}$. Accordingly, the decision is made that BTS2 should not transmit the downlink signal in the next time slot, so as to reduce the network interference resulting from transmission of that downlink signal.

In the embodiment described above, the selection of the BTS to be used to transmit the downlink signal in the next time slot is made in the mobile station 40. However, it is not essential that this decision be made there. In another embodiment, which will be described hereinafter with reference to FIGS. 11 to 13, each BTS includes a modified soft hand-off control portion, and these modified hand-off control portions cooperate to carry out the downlink-signal decision making.

Figure 11:
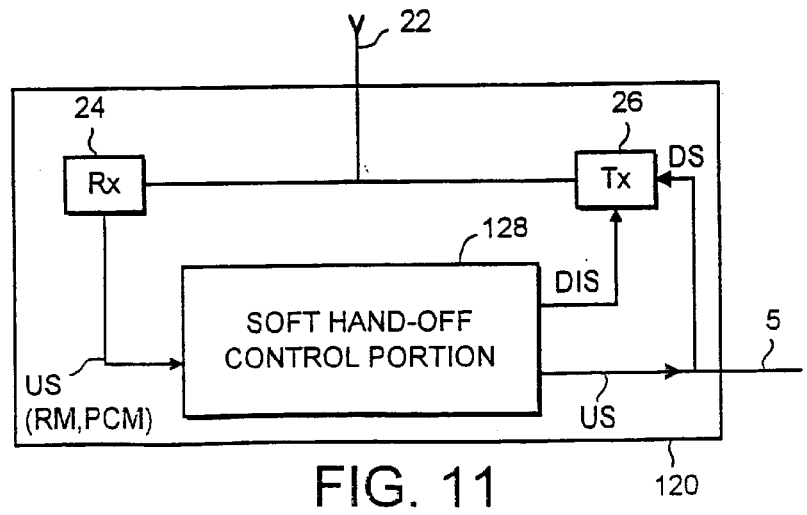
FIG. 11 shows parts of another base transceiver embodying the present invention.

Referring firstly to FIG. 11, a BTS 120 is constituted in basically the same manner as the BTS 20 described previously with reference to FIG. 9 but has a modified soft hand-off control portion 128 in place of the soft hand-off control portion 28 in the FIG. 9 BTS.

Figure 12:
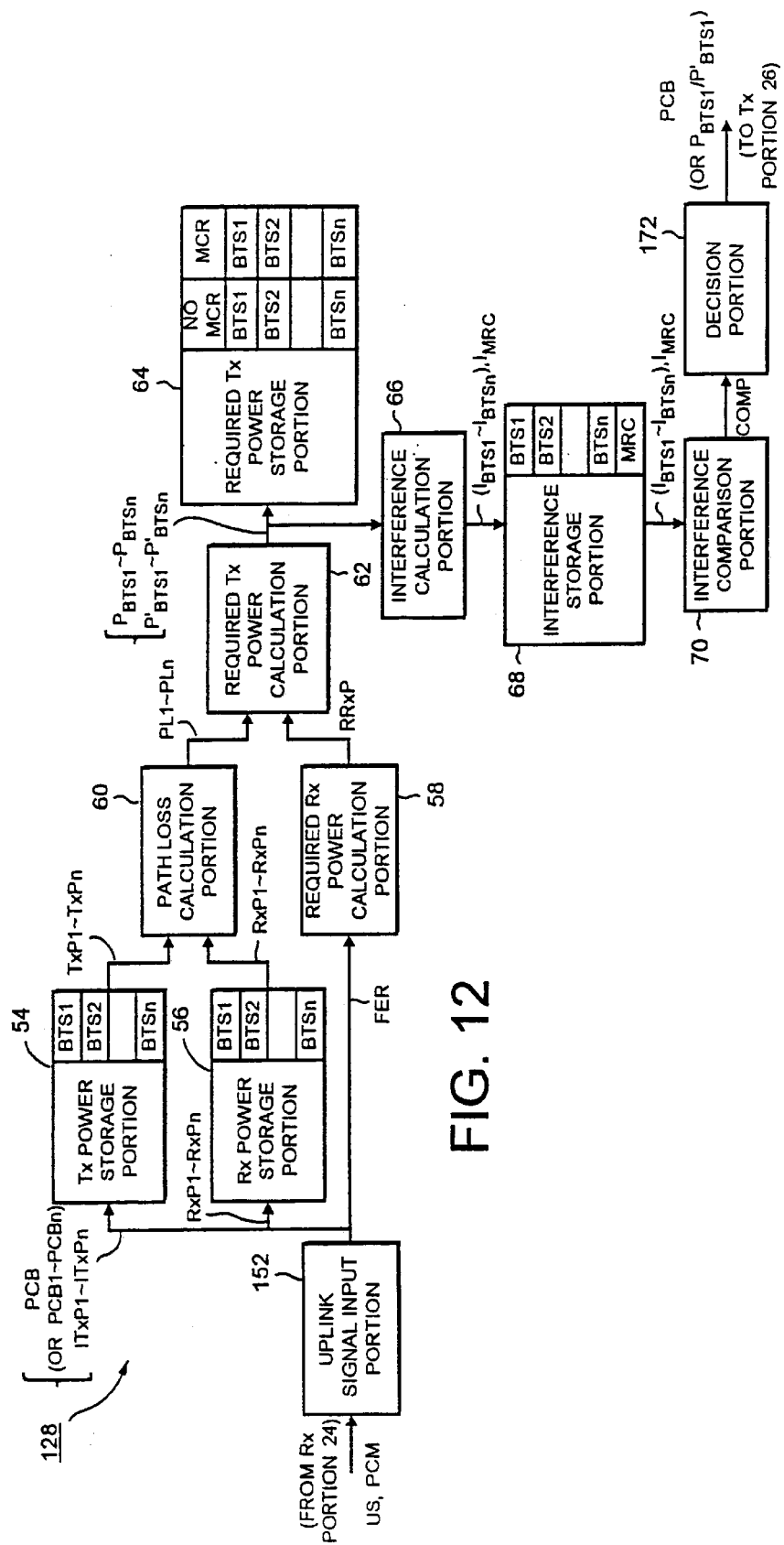
FIG. 12 is a detailed block diagram of parts of the FIG. 11 base transceiver station.

An example of the constitution of the modified soft hand-off control portion 128 is shown in FIG. 12.

As will apparent from FIG. 12 itself, the modified soft hand-off control portion 128 in this embodiment includes the portions 54, 56, 58, 60, 62, 64, 66, 68 and 70 previously included in the downlink signal processing portion 48 of the MS 40 in the FIG. 7 embodiment. However, in place of the downlink signal processing portion 52 in the FIG. 7 embodiment, the FIG. 12 embodiment has an uplink signal input portion 152. Also, in place of the BTS selection portion 72 in the FIG. 7 embodiment, the FIG. 12 embodiment has a decision portion 172.

Operation of the FIG. 12 embodiment will now be described with reference to the flowchart of FIG. 13. Again, in the FIG. 13 flowchart it is assumed, for the sake of simplicity, that only two BTSs, BTS1 and BTS2, are involved in the soft hand-off operation. As will be apparent from FIG. 13 itself, many of the steps in the FIG. 13 flowchart are the same as (or correspond to) the steps S1 to S19 in the FIG. 8 flowchart relating to operation of the FIG. 7 embodiment.

Figure 13:
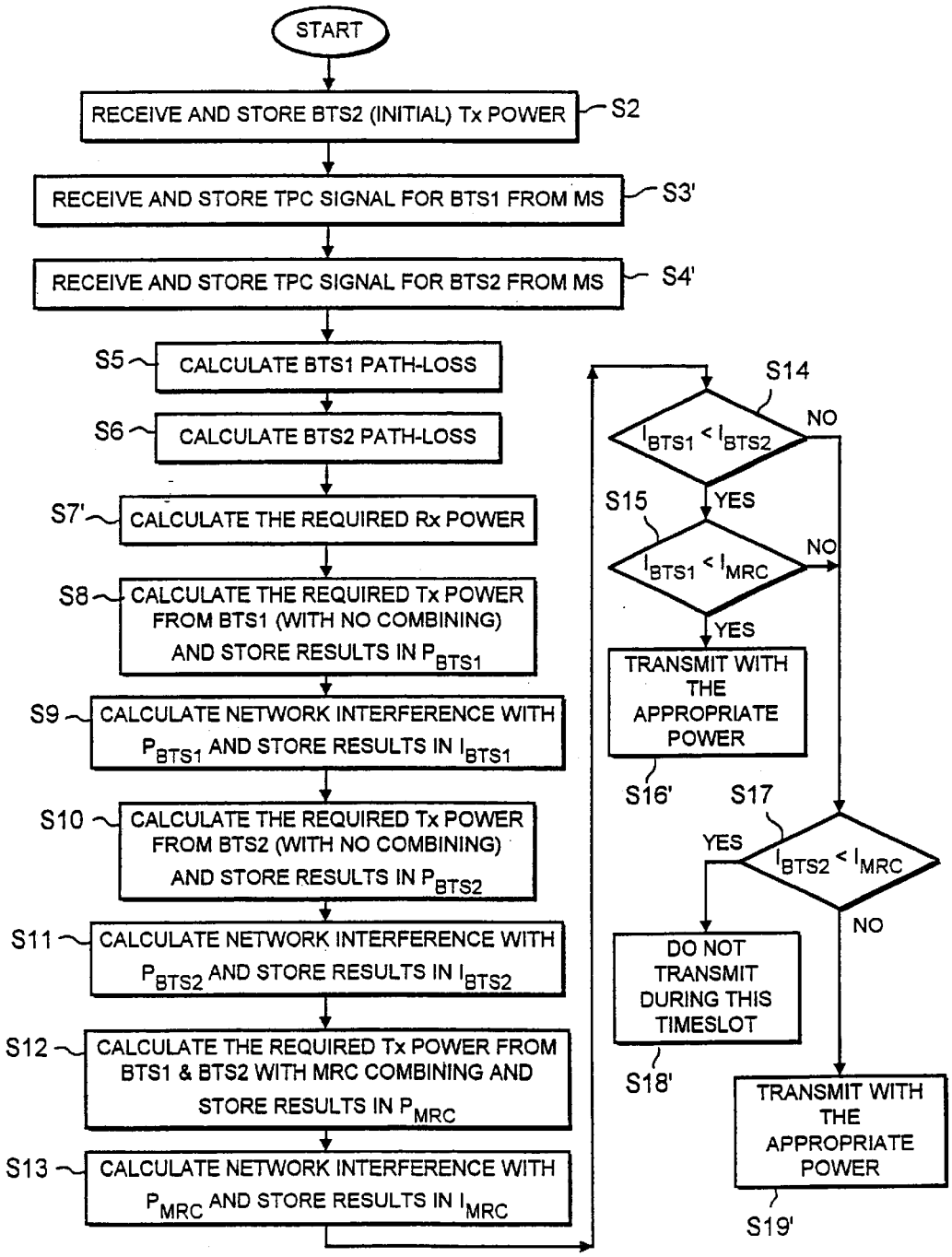
FIG. 13 shows a flowchart for use in explaining operation of the FIG. 11 base transceiver station.

The FIG. 13 flowchart relates to processing performed at BTS1 during the soft hand-off operation. Accordingly, the step S1 used in the FIG. 8 flowchart is not required in FIG. 13, as the soft hand-off control portion 128 in BTS1 already knows the instantaneous downlink transmission power of BTS1 (this is stored in the storage region allocated to BTS1 in the TX power storage portion 54). However, BTS1 does need to know the downlink transmission power of the other BTS, BTS2, involved in the soft hand-off operation. Accordingly, in step S2, the initial transmission power ITXP2 for BTS2 is received (in one of the uplink signals US) from the mobile station. The mobile station can include this information for example in the ranking message RM which it transmits periodically or whenever a new BTS becomes involved in the soft hand-off operation. The received initial transmission power ITXP2 for BTS2 is stored in the storage region allocated to BTS2 in the TX power storage portion 54.

Incidentally, the downlink power control in this embodiment is performed in the same way as in the FIG. 7 embodiment. Thus, the mobile station may either use a single PCB in common to control the downlink transmission powers of all of the BTSs involved in the soft hand-off operation, or alternatively the mobile station may allocate each involved BTS its own PCB. In any event, the TX power storage portion 54 needs to receive the PCBs applicable to all of the BTSs involved in the soft hand-off operation. If there is a single PCB allocated to all the BTSs, then this single PCB will be available to the soft hand-off control portion 128 from one of the uplink signals US received from the mobile station. If, on the other hand, each involved BTS is allocated its own PCB by the mobile station, then some mechanism must be provided for enabling each involved BTS to receive the respective PCBs of all the other involved BTSs. One suitable mechanism for achievings this is described in co-pending PCT patent publication No. WO 99/59367, the entire content of which is incorporated herein by reference. In this proposed mechanism, the mobile station includes, in an uplink signal transmitted thereby to each involved BTS, a power control message (PCM) made up, in the order of ranking of the involved BTSs determined by the mobile station, the respective PCBs of all the involved BTSs. Thus, this PCM would have a format similar to that of the BSM shown in FIG. 9, except that in this case each bit would be the PCB of the BTS concerned.

Thus, in the FIG. 12 embodiment, any PCB (or PCM as the case may be) included in an uplink signal US received from the mobile station is detected by the uplink signal input portion 152 and supplied to the TX power storage portion 54 so as to enable the TX power storage portion 54 to update the transmission power TXP for each of the BTSs involved in the soft hand-off operation.

After the step S2, processing proceeds to a step S3'. This step S3' corresponds generally to the step S3 in the FIG. 8 flowchart. In this step S3', the uplink signal input portion 152 detects, in one of the uplink signals US received from the mobile station, a transmission power control (TPC) signal representing the power RXP1 at which the downlink signal from BTS1 was received by the mobile station. This received power RXP1 for BTS1 is stored in the storage region allocated to BTS1 in the RX power storage portion 56. In step S4' the same operation is repeated for BTS2.

Then, in steps S5 and S6, the path loss calculation portion 60 calculates the respective path losses PL1 and PL2 for the downlink signals sent to the mobile station by BTS1 and BTS2.

In step S7', which corresponds to the step S7 in the FIG. 8 flowchart, the required RX power calculation portion 58 determines a required receive power RRXP for the mobile station. This may be achieved, for example, by the mobile station including, in one of the uplink signals US transmitted thereby, a measure of the downlink channel performance, for example the frame error rate (FER) of the downlink signal received by the mobile station. When such a communications-channel measure (FER) in a received uplink signal US is detected by the uplink signal input portion 152 it supplies this measure to the required RX power calculation portion 58 for use thereby in generating the RRXP.

The steps S8 to S15 and S17 in FIG. 13 are then the same as the corresponding steps in the FIG. 8 flowchart.

In step S16', which corresponds to the step S16 in the FIG. 8 flowchart, the decision portion 172 in the soft hand-off control portion 128 of BTS1 determines that BTS1 (alone) should transmit the downlink signal DS in the next time slot to the mobile station on the basis that this will result in the lowest network interference. The decision portion 172 then generates suitable power control information (for example a PCB) so as to adjust the downlink transmission power to the value $P_{BTS1}$ determined in step S8.

Rather than a PCB, this power control information may simply be the explicit required transmission power $P_{BTS1}$ in this case.

If the determination in step S17 is that $I_{BTS2}$ is less than $I_{MRC}$, the decision portion 172 determines in step S18' that BTS1 should not transmit the downlink signal in the next time slot. Thus, the decision portion 172 applies the disabling signal DIS to the transmission portion 26 in its BTS (BTS1).

If, on the other hand, in step S17 it is determined that $I_{MRC}$ is less than or equal to $I_{BTS2}$, then in step S19' the decision portion 172 determines that both BTS1 and BTS2 should be used in the next time slot to transmit the downlink signal. In this case, it sends appropriate power control information (a PCB or possibly the explicit downlink transmission power $P'_{BTS1}$) to the transmission portion 26.

It will be appreciated that the processing shown in FIG. 13 is also carried out independently in the other BTS, BTS2, involved in the soft hand-off operation (in that case, of course, in step S2, the received initial transmission power that is received and stored is ITXP1 relating to BTS1).

Naturally, the decision-making embodied in steps S14 to S19' in FIG. 13 must be made consistent in each different BTS involved in the soft hand-off operation so that there will always be at least one BTS which transmits the downlink signal to the mobile station in the next time slot.

In the embodiments described above, the TX power storage portion 54 receives the initial downlink transmission powers of the involved BTSs and then updates these as necessary on receipt of the power control bits PCBs for the different BTSs. However, it would also be possible for the instantaneous downlink transmission powers TXP themselves to be supplied directly to the TX power storage portion 54 in each time slot in place of the PCBs.

It will also be appreciated that it would also be possible for the decision as to which BTS is to transmit the downlink signal in the time slot to be made in the BSC 30 instead of in each involved BTS. In this case, the elements 54 to 70, 152 and 172 shown in FIG. 11 would be provided in the BSC instead of in each BTS.

It will also be understood that the way in which the transmission powers TXP (or IXTP+ΣPCB) and receive powers RXP are made available to the decision-making entity (be it MS, BTS or BSC) is not critical to the invention. For example, it is not necessary for the MS to rank the BTSs. All that is necessary is that each BTS is able to identify to which BTS a particular received value (e.g. ITXP or RXP) relates. Such identification could be carried out in many different ways other than ranking.

It will also be understood that it is not necessary for the processing shown in FIGS. 8 and 13 to take place every time slot. It would be possible for the signals such as RXP and PCM to be transmitted only once per frame, in which case the decision-making would be made on a frame-by-frame basis.

Next, another example of downlink processing in the FIG. 5 network will be described with reference to FIGS. 14 and 15. In such downlink processing, if macro-diversity based on maximum ratio combining (MRC) is required at the MS during the soft hand-off operation, all of the BTSs involved in the soft hand-off operation must transmit the same information to the MS. However, if MRC is not required at the MS in the soft hand-off region, downlink macro-diversity can be based on selection (or switched) diversity at the BSC 30, in accordance with another embodiment of the present invention.

Figure 14:
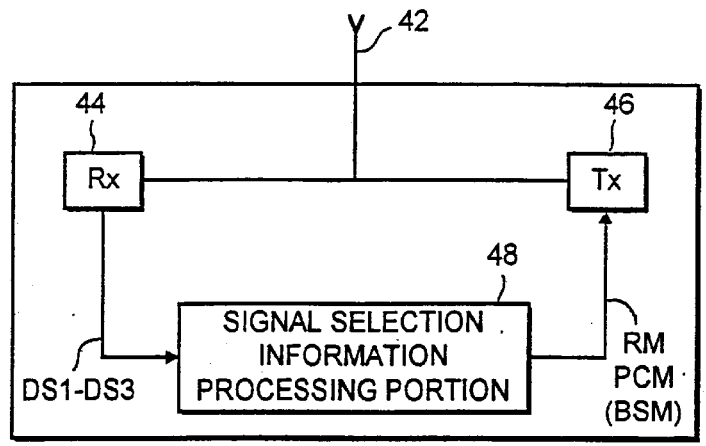
FIG. 14 shows parts of a mobile station in another embodiment of the present invention.

FIG. 14 is a block diagram showing parts of a MS 40 in this embodiment of the present invention. An antenna element 42 is connected (e.g via a duplexer—not shown) to a receiver portion 44 and a transmitter portion 46. A signal selection information processing portion 48 from the receiver portion 44 respective downlink signals DS1 to DS3 produced by the three BTSs BTS1 to BTS3 involved in the soft hand-off operation. The signal selection information processing portion 48 applies a ranking message RM and a power control message PCM to the transmitter portion 46.

The signal selection information processing portion 48 processes the respective downlink signals DS1 to DS3 received from the BTSs (BTS1 to BTS3) involved in the soft hand-off operation, and compares these downlink signals according to a predetermined property. In a preferred embodiment, the predetermined property is the received signal strength (RSS), possibly together with the signal-to-interference ratio (SIR). These performance measures are determined for the downlink DCCH.

The signal selection information processing portion 48 employs the performance measures to select which of the BTSs involved in the soft hand-off operation is to be used to transmit the downlink signal to the MS in the next time slot.

The signal selection information processing portion 48 may select the BTS that is to transmit the downlink signal in the next time slot based on the following cases.

Case 1: If the RSS (and/or SIR) of a single BTS is higher than each other BTS, that single BTS is selected to transmit the downlink signal in the next time slot.

Case 2: If two or more BTSs have comparably-good RSS (and/or SIR), one of them is selected based on an order of ranking (e.g. order of involvement in the soft hand-off operation or random).

Case 3: If all the BTSs involved in the soft hand-off operation fail to meet a prescribed RSS (and/or SIR) threshold, all the BTSs are selected to transmit the downlink signal in the next time slot, so that a MRC operation can be performed at the MS 40 to give the best chance of obtaining a useful signal.

After determining which BTS(s) is/are to be used, the signal selection information processing portion 48 transmits a BTS selection message (BSM), identifying the BTS(s) to be used, to all of the BTSs on a control channel.

For example, using two bits to provide the BSM, the BSM may be set to "01" to designate BTS1; "10" to designate BTS2; and "11" to designate BTS3. "00" denotes that all the BTSs should be used to transmit the downlink signal in the next time slot.

Each BTS receives the BSM via the control channel from the MS 40. One or more of the BTSs then forward the BSM to the BSC 30. All BTSs could forward the BSM to the BSC.

Figure 15:
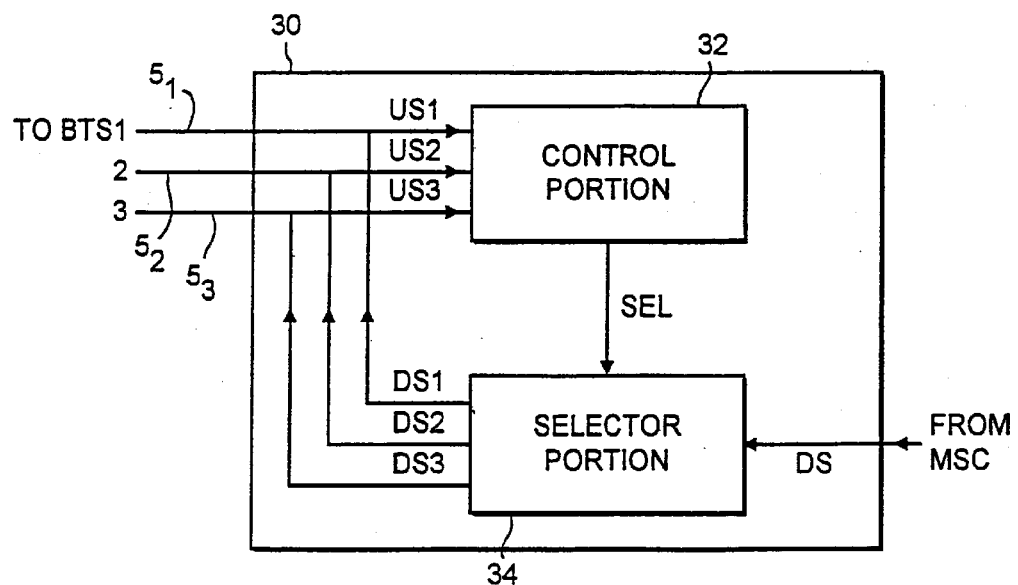
FIG. 15 shows parts of a base station controller suitable for use with the FIG. 14 mobile station.

FIG. 15 shows part of a BSC adapted to perform downlink processing with the FIG. 14 mobile station. The BSC 30 includes a control portion 32 and a selector portion 34.

In this example, it is assumed that the connection lines $5_1$ to $5_3$ linking each BTS to the BSC 30 are duplex lines which carry respective uplink and downlink signals US and DS between the BTS concerned and the BSC. For example, a first connection line $5_1$ carries respective uplink and downlink signals US1 and DS1 between the BTS1 and the BSC 30.

The selector portion 34 receives at its input a downlink signal DS supplied by the MSC (7 in FIG. 5). The selector portion 34 has three outputs connected respectively to the connection lines $5_1$ to $5_3$.

The selector portion 34 also has a control input which receives a selection signal SEL. In response to the SEL selection signal the selector portion 34 connects its input to one, or all, of its three outputs.

The control portion 32 also has three inputs connected respectively to the connection lines $5_1$ to $5_3$ for receiving the uplink signals US1 to US3 from BTS1 to BTS3 respectively. The control portion applies the selection signal SEL to the selector portion 34. As can be appreciated the selector portion 34 may be part of the BTSs, such that the selection signal SEL selects a BTS(s) for transmission of the downlink signal.

In operation of the BSC shown in FIG. 15, in each time slot of the uplink signal the control portion 32 receives one or more of the three uplink signals US1 to US3 from the BTSs involved in the soft hand-off operation. When the BSM supplied by the MS 40 is detected within a received uplink signal US1, US2 or US3, the control portion 32 examines the BSM and determines therefrom which of the BTSs is to be used to transmit the downlink signal in the next time slot to the MS 40.

If the BSM designates a single BTS, the control portion 32 sets the selection signal SEL such that the selector portion 34 supplies the downlink signal DS just to that one of the connection lines $5_1$ to $5_3$ connecting the BSC 30 to the designated BTS. If, on the other hand, all BTSs are designated by the BSM, the selection signal SEL is set so that the downlink signal DS received from the MSC 7 is supplied to all of the connection lines $5_1$ to $5_3$.

It will be appreciated that it is not necessary for the downlink processing to be performed on a time slot-by-time slot basis. It could be performed on a frame-by-frame basis or the BTS selection could be made at some other suitable time interval.

It would also be possible for the signal selection information processing portion 48 (FIG. 14) to include its own storage portion enabling it to store a past history of the RSS (and/or SIR) measures for the different BTSs currently involved in the soft hand-off operation. In this case, it would be possible for the MS to employ more sophisticated decision-making in relation to the BTS selection so as to avoid undesirable effects caused by temporary reception phenomena or other problems caused by too frequent-changing of the BTS selection.

It is not necessary for the mobile station to carry out the comparison of the signal measures for the different downlink signals and make the determination of the BTS to be used to transmit the downlink signal. The comparison and BTS determination could be carried out in the BSC; in this case instead of transmitting the BSM to the BTSs involved in the soft hand-off operation, the mobile station could transmit the downlink signal measures themselves (in some suitable form). These measures would then be delivered in the usual way to the BSC, enabling it to compare them and then make the BTS determination.

In the embodiment of FIGS. 6 to 8 the processing is carried out mainly in the mobile station, whereas in the embodiment of FIGS. 11 to 13 the processing is carried out mainly in the BTSs. However, the present invention is not limited to these possibilities. For example, the processing could be carried out mainly in the base station controller or in the mobile switching center. It would also be possible for the processing to be distributed amongst any two or more or these network elements.

Furthermore, it would be possible for the decisions to be made at time intervals other than frames or time slots, for example based on a time interval consistent with the fading characteristics of the RF channels in the network.

Although the present invention has been described above in relation to the proposed European wideband CDMA system (UTRA) it will be appreciated that it can also be applied to a system otherwise in accordance with the IS95 standard. It would also be possible to apply the invention in other cellular networks not using CDMA, for example networks using one or more of the following: multiple-access techniques: time-division multiple access (TDMA), wavelength-division multiple access (WDMA), frequency-division multiple access (FDMA) and space-division multiple access (SDMA).

What is claimed is:

1. A method for disabling the transmission of downlink signals in a mobile communications network wherein a base station controller provides downlink signals to a plurality of base stations in a soft handoff mode with a mobile station, each capable of further transmitting the downlink signals to and receiving uplink signals from a mobile station while in the soft hand off mode, comprising the steps of:

comparing a transmission characteristic of each downlink signal received at said mobile station;

selecting a preferred downlink signal based on the measured transmission characteristic;

identifying a preferred base station for transmitting a subsequent downlink signal based on the preferred downlink signal;

generating and transmitting a selection message in the uplink signal indicating the preferred base station;

identifying in each base station of said plurality of base stations whether said base station is the preferred base station responsive to the received uplink signal;

determining in each base station whether the base station should transmit the subsequent downlink signal responsive to the identifying step;

disabling in each base station, the transmission of the subsequent downlink signal received from said base station controller when the base station determines it should not transmit; and periodically reselecting the preferred downlink signal based on the measured transmission characteristic and identifying the preferred base station for transmitting the subsequent downlink signal based on the preferred downlink signal.

2. The method of claim 1, wherein said selection message includes data for indicating the preferred base station for transmitting a subsequent downlink signal.

3. The base station of claim 1, wherein said transmission characteristic is represented by power levels of the received downlink signals.

* * * * *